US007007146B2

(12) United States Patent
Romanufa et al.

(10) Patent No.: US 7,007,146 B2
(45) Date of Patent: Feb. 28, 2006

(54) SYSTEM AND METHOD FOR RELOCATING PAGES PINNED IN A BUFFER POOL OF A DATABASE SYSTEM

(75) Inventors: Keriley K. Romanufa, Scarborough (CA); Aamer Sachedina, Newmarket (CA)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 10/421,250

(22) Filed: Apr. 22, 2003

(65) Prior Publication Data

US 2004/0168035 A1 Aug. 26, 2004

(30) Foreign Application Priority Data

Feb. 26, 2003 (CA) .................................. 2419900

(51) Int. Cl.
*G06F 12/00* (2006.01)

(52) U.S. Cl. ...................................... 711/165; 711/171

(58) Field of Classification Search ................ 711/165, 711/171; 707/205
See application file for complete search history.

(56) References Cited

U.S. PATENT DOCUMENTS 4,277,826 A 7/1981 Collins et al.
5,440,692 A * 8/1995 Janicek ....................... 707/101
5,701,486 A 12/1997 Gilbertsen et al.
5,860,116 A 1/1999 Washington ................ 711/148
6,347,364 B1 2/2002 Liedtke ...................... 711/163
2004/0078541 A1 * 4/2004 Lightstone et al. ......... 711/171

* cited by examiner

*Primary Examiner*—Hiep T. Nguyen
(74) *Attorney, Agent, or Firm*—Samuel A. Kassatly

(57) ABSTRACT

A system and associated method are provided for directing a database management system, to relocate buffer pages that are pinned in a buffer pool of a data processing system. Each of the buffer pages has a respective page descriptor for indicating the location of the buffer page in the buffer pool. Once the pages are relocated, the now free system memory of the buffer pool is resized. Prior to resizing, a selected pinned page is latched by an agent of the system, wherein the selected page of the buffer pages is in a resize region of the buffer pool. The pinned and latched page becomes a fixed page. The agent for the database management system determines a suitable relocation region of the buffer pool for the fixed page. A resizer module copies the contents of the fixed page to the relocation region and changes the respective page descriptor to indicate the relocation region. The resizer module performs the relocation of other pages in the resize region to allow dynamic resizing of the buffer pool while maintaining the presence of pinned versions of the pages in the buffer pool prior to resizing.

30 Claims, 11 Drawing Sheets

OPERATION OF DMBS FOR RESIZING A BUFFER POOL WHEN PROCESSING A QUERY "AFTER BUFFERPOOL X SIZE Y"

S600

SYSTEM AND METHOD FOR RELOCATING PAGES PINNED IN A BUFFER POOL OF A DATABASE SYSTEM

PRIORITY CLAIM

The present application claims the priority of Canadian patent application, Serial No. 2,419,900, titled "Relocating Pages that are Pinned in a Buffer Pool in a Database System," which was filed on Feb. 26, 2003, and which is incorporated herein by reference.

FIELD OF THE INVENTION

The present invention relates to memory resource management in databases. More specifically, the present invention relates to relocating pages that are pinned in a buffer pool in a database system.

BACKGROUND OF THE INVENTION

A buffer pool typically contains a number of pages either free or in use. Under certain circumstances, it may be necessary to decrease the size of a buffer pool. Known database systems require that the size of the buffer pool be capable of decreasing dynamically (that is, on the fly) without requiring a quiesce or an exclusive access to the buffer pool for decreasing the buffer pool size. One disadvantage with dynamic resizing of buffer pools is that the size can only be reduced once the pages attempting to be freed are no longer 'in use' (i.e. not fixed: pinned or latched).

The operation of freeing regions of the buffer pool can be inefficient, especially if there are many 'pinned' pages. These pinned pages are generally frequently accessed pages in the region of the buffer pool to be freed. One complication for resizing buffer pool regions is that pages are often pinned for a long duration of time; they may be fixed once, latched and unlatched many times depending on the number of rows on the page. A standard solution is for the buffer pool resizing to serialize on pages that are 'in use'. However, pinned pages pose a problem to this solution as they could remain pinned for long periods of time.

Current systems include implementations for resizing that do not wait for the buffer pool decrease to be fully completed. For example, when an ALTER BUFFERPOOL SQL is issued to decrease the size of a buffer pool dynamically, this command can return before the memory that is being decreased is actually freed. This is typically a "last man out" solution, where the ALTER BUFFERPOOL SQL initiates a decreasing activity and is finished before the decrease is actually accomplished.

Thus, there is need for a system that can dynamically resize a buffer pool by directing a database management system to relocate buffer pages that are pinned in the buffer pool. The need for such a system has heretofore remained unsatisfied.

SUMMARY OF THE INVENTION

The present invention satisfies this need, and presents a system, a computer program product, and an associated method (collectively referred to herein as "the system" or "the present system") for relocating pages that are pinned in a buffer pool The present system relies on a dynamic pinning procedure. This dynamic pinning procedure determines how the pinned buffer pool page is moved during a decrease in the size of the buffer pool. In addition, the dynamic pinning procedure determines how all new users of the pinned buffer pool page are ensured of finding the pinned buffer pool page in the new location or region of the buffer pool. For example, a free region (i.e. free page) is found in the buffer pool allowing movement of the buffer pool page, wherein the free region is not in the area of the buffer pool being decreased. When the buffer pool is being reduced in size, the present system decides which part of the buffer pool will be freed. Consequently, the present system has knowledge regarding which part of the buffer pool needs to be emptied of buffer pool pages so that it can be freed. The present system thus knows what other part of the buffer pool is not going to be freed in the context of the current decrease operation. The buffer pool resizer can intelligently find a free region in the area of the buffer pool that is not to be freed for the pinned buffer pool page yet which is currently in the area of the buffer pool that is to be freed.

The present system determines how the current "pinners" of the pinned buffer pool page are handled. Pinners are agents that have pinned the buffer pool page. The agent using a specific buffer pool page in the buffer pool is in one of three states: the pinned state, the fixed state, or the latched state. The agent that has pinned the buffer pool page would be in the pinned state. In addition, the present system determines when the present system may free memory of the buffer pool that the pinned buffer pool page occupies.

According to the present invention there is provided, for a database management system having a buffer pool, buffer pages included in the buffer pool, the buffer pages adapted to be pinned in the buffer pool, and a page descriptor included with a respective buffer page, the page descriptor for indicating a location of the respective buffer page in the buffer pool, a method for directing the database management system to relocate the buffer pages, the method including the steps of: latching a selected pinned page of the buffer pages in a resize region of the buffer pool, the pinned and latched page thereby becoming a fixed page, determining a suitable relocation region of the buffer pool for the fixed page, copying the contents of the fixed page to the relocation region, and changing the respective page descriptor to indicate the relocation region.

According to a further aspect of the present invention there is provided, for a database management system having a buffer pool, buffer pages included in the buffer pool, the buffer pages adapted to be pinned in the buffer pool, and a page descriptor included with a respective buffer page, the page descriptor for indicating a location of the respective buffer page in the buffer pool, a computer program product having a computer-readable medium tangibly embodying computer executable instructions for directing a database management system to relocate buffer pages, the computer program product including: computer readable code for latching a selected pinned page of the buffer pages in a resize region of the buffer pool, the pinned and latched page thereby becoming a fixed page, computer readable code for determining a suitable relocation region of the buffer pool for the fixed page, computer readable code for copying the contents of the fixed page to the relocation region, and computer readable code for changing the respective page descriptor to indicate the relocation region.

According to a further aspect of the present invention there is provided, for a database management system having a buffer pool, buffer pages included in the buffer pool, the buffer pages adapted to be pinned in the buffer pool, and a page descriptor included with a respective buffer page, the page descriptor for indicating a location of the respective buffer page in the buffer pool, an article including a computer-readable signal-bearing medium usable on a network, and including means in the medium for directing a database management system to relocate buffer pages, the article including: means in the medium for latching a selected pinned page of the buffer pages in a resize region of the buffer pool, the pinned and latched page thereby becoming a fixed page, means in the medium for determining a suitable relocation region of the buffer pool for the fixed page, means in the medium for copying the contents of the fixed page to the relocation region, and means in the medium for changing the respective page descriptor to indicate the relocation region.

According to a further aspect of the present invention there is provided a database management system having a buffer pool, buffer pages included in the buffer pool, the buffer pages adapted to be pinned in the buffer pool, and a page descriptor included with a respective buffer page, the page descriptor for indicating a location of the respective buffer page in the buffer pool, the database management system for relocating buffer pages, the database management system including: a latching module for latching a selected pinned page of the buffer pages in a resize region of the buffer pool, the pinned and latched page thereby becoming a fixed page, a determinator module for determining a suitable relocation region of the buffer pool for the fixed page, and a resizer module coupled to the determinator module for copying the contents of the fixed page to the relocation region and changing the respective page descriptor to indicate the relocation region.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Hash Table/Hash Bucket: A lookup table that is designed to efficiently store non-contiguous keys (account numbers, part numbers, etc.) that may have wide gaps in their alphabetic and numeric sequences. Hash tables are created by using a hashing function (algorithm) to hash the keys into hash buckets. Each bucket is a list of key value pairs. Since different keys may hash to the same bucket, the goal of hash table design is to spread out the key-value pairs evenly with each bucket containing as few key-value pairs as possible. When an item is looked up, its key is hashed to find the appropriate bucket. Then, the bucket is searched for the right key-value pair.

Hashing: Creating hash tables.

Metadata: data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

Victim Page: a page designated for removal or for discarding.

The following detailed description of the embodiments of the present invention does not limit the implementation of the invention to any particular computer programming language. The present invention may be implemented in any computer programming language provided that the OS (Operating System) provides the facilities that may support the requirements of the present invention. An exemplary embodiment is implemented in the C or C++ computer programming language (or other computer programming languages in conjunction with C/C++). Any limitations presented would be a result of a particular type of operating system or computer programming language and would not be a limitation of the present invention.

Figure 1:
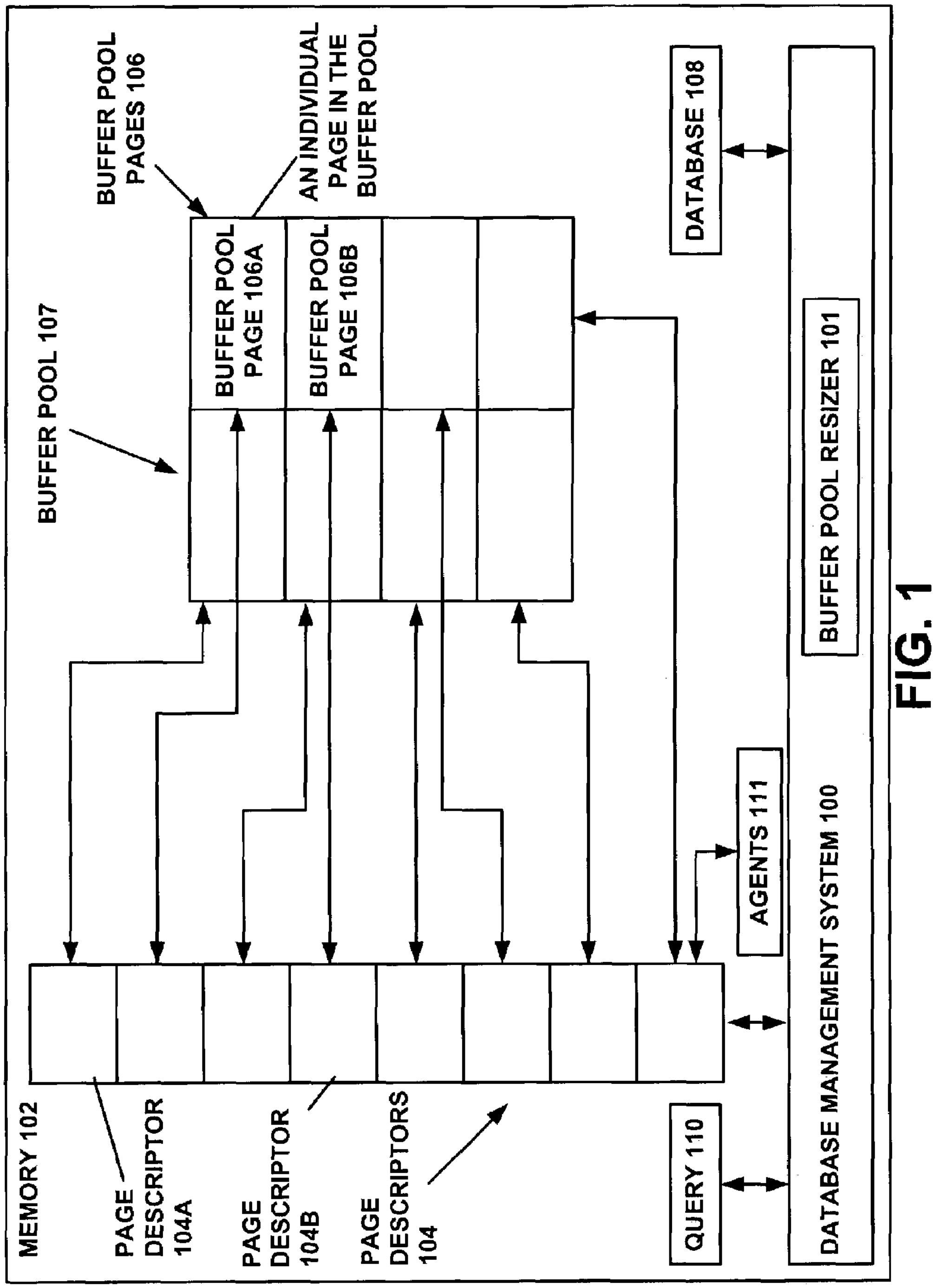
FIG. 1 is a schematic illustration of an exemplary database management system environment in which a buffer pool resizing system of the present invention can be used.

FIG. 1 shows a database management system (DBMS) 100 operating with buffer pool pages 106. A buffer pool 107 contains a plurality of the buffer pool pages 106, such as buffer pool page 106A, 106B. The DBMS 100 can be software stored in memory 102 of a data processing system, or stored in a distributed data processing system (not depicted). The data processing system includes a CPU (Central Processing Unit) operatively coupled to the memory 102, which also stores an operating system (not depicted) for general management of the data processing systems. The data processing system also has an I/O module for interacting with the memory 102. An example of the data processing system is an IBM ThinkPad computer. The DBMS 100 includes computer executable programmed instructions for directing the data processing system to implement the embodiments of the present invention.

The programmed instructions may be embodied on a computer readable medium (such as a CD disk or floppy disk) which may be used for transporting the programmed instructions to the memory 102 of the data processing system. Alternatively, the programmed instructions may be embedded in a computer-readable, signal-bearing medium that is uploaded to a network by a vendor or supplier of the programmed instructions, and this signal-bearing medium may be downloaded to the data processing system from a network by end users or potential buyers.

A buffer pool page 106A is an individual page in the buffer pool 107 (that is, buffer pool 107 is a collection of the buffer pool pages 106). Each buffer pool page 106 has a corresponding page descriptor 104. For example, page descriptor 104A corresponds with the buffer pool page 106A and page descriptor 104B corresponds with buffer pool page 106B. One purpose of the page descriptors 104 is to accurately describe the corresponding buffer pool page 106. For example, the page descriptor 104 would contain information regarding the table of a database 108 to which the buffer pool page 106 belongs.

The page descriptors 104 can provide a quick method by which agent 111 (shown generally in FIG. 1 as an arrow) can determine the contents of buffer pool 107. The structure of the page descriptors 104 is convenient and easy to manage as it is smaller. That is, the agent 111 can look at the page descriptor 104 to know what information is contained in the buffer pool page 106 to which it points without having looked at the actual buffer pool page 106.

In addition there can be metadata per buffer pool page 106 (not shown). This metadata effectively does not belong in the buffer pool page 106, as it only applies to a running system and would only waste space on a disk of the database 108. This metadata comprises pointers for the various linked lists on which the buffer pool page 106 should be included and latches.

There exists a 1:1 mapping between the page descriptor 104 and the buffer pool page 106. For example, page descriptor 104A at spot 0 in a page descriptor array (not shown) points to the buffer pool page 106A at spot 0 in the buffer pool 107. Page descriptor 104B at spot 1 in the page descriptor array points to the buffer pool page 106B at spot 1 in the buffer pool 107, etc. The page descriptors 104 contain metadata about the buffer pool pages 106 as well as pointers to the buffer pool pages 106. The agent 111 will usually go through the page descriptor 104 of the buffer pool page 106 to obtain access to the buffer pool 107. The agent 111 is a process included in the DBMS 100 for obtaining information about the database 108.

Figure 3:
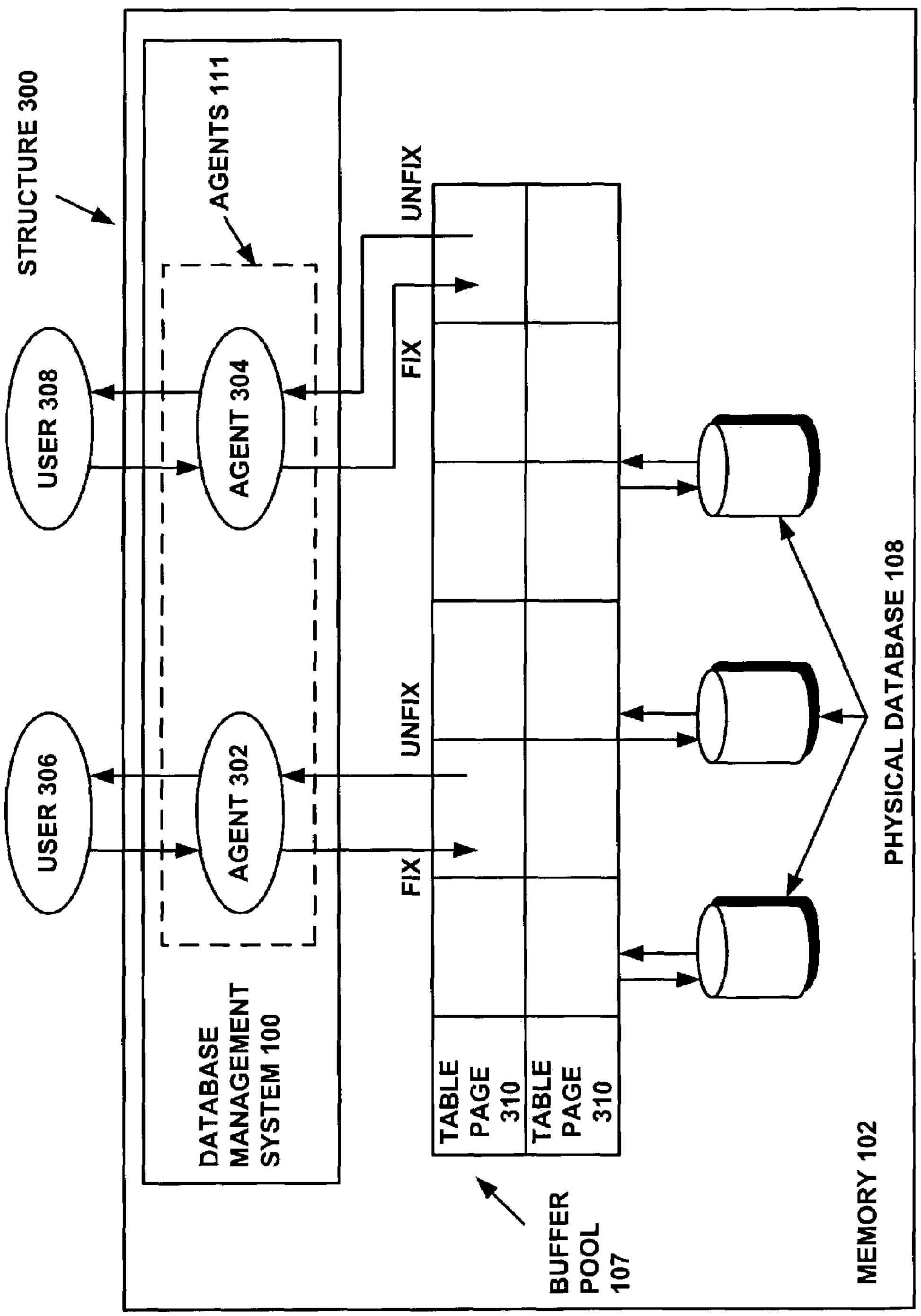
FIG. 3 is a diagram showing a structure for fixing and unfixing the buffer pool pages of the database management system of FIG. 1.

FIG. 3 illustrates a structure 300 for fixing and unfixing the buffer pool pages 106. Users 306, 308 request information from stored in database 108. The DBMS 100 retrieves this information by means of a query 110. Rather than repeatedly accessing a physical disk of the database 108 each time the user 306, 308 queries for some information stored in the database 108, a commonly requested part of this information or data is stored in the main dynamic memory. This main dynamic memory is also commonly referred to as the buffer pool 107. Storing commonly requested information or data in the buffer pool 107 helps accelerate retrieval of this information for the user 306, 308. This retrieval of information is performed by means of the agent 111 or processes of agent 111, which are processes or threads within the DBMS 100 that act on behalf of users 306, 308. These agent 111 locate whatever information they have been asked to retrieve, preferably from the buffer pool 107.

The DBMS 100 comprises a buffer pool resizer 101 for resizing the buffer pool 107. During the processing of the query 110 entered by user 306, 308, the agent 111 may wish to read or update a particular buffer pool page 106. To accomplish this read or update, the DBMS 100 must first "fix" the buffer pool page 106 in the buffer pool 107.

The operation for fixing the buffer pool pages 106 comprises a pinning operation and a latching operation. The pinning operation finds the buffer pool page 106 (see FIG. 3) and guarantees that the buffer pool page 106 will not move out of the buffer pool 107. The latching operation protects the pinned buffer pool page 106 from access by other agent 111. The latching can include an exclusive (X) operation if the buffer pool page 106 is being updating, or can include a shared protection (S) if the buffer pool page 106 is being read. The symbol (X) is just an example notation that programmers typically to use to reference an exclusive operation. Similarly (S) is used to reference shared protection.

When the agent 111 is finished with the buffer pool page 106, the agent 111 will "unfix" the buffer pool page 106. Consequently, the buffer pool page 106 will no longer be pinned or latched. Fixing and unfixing of the buffer pool page 106 is depicted in FIG. 3, as further described below.

Figure 2:
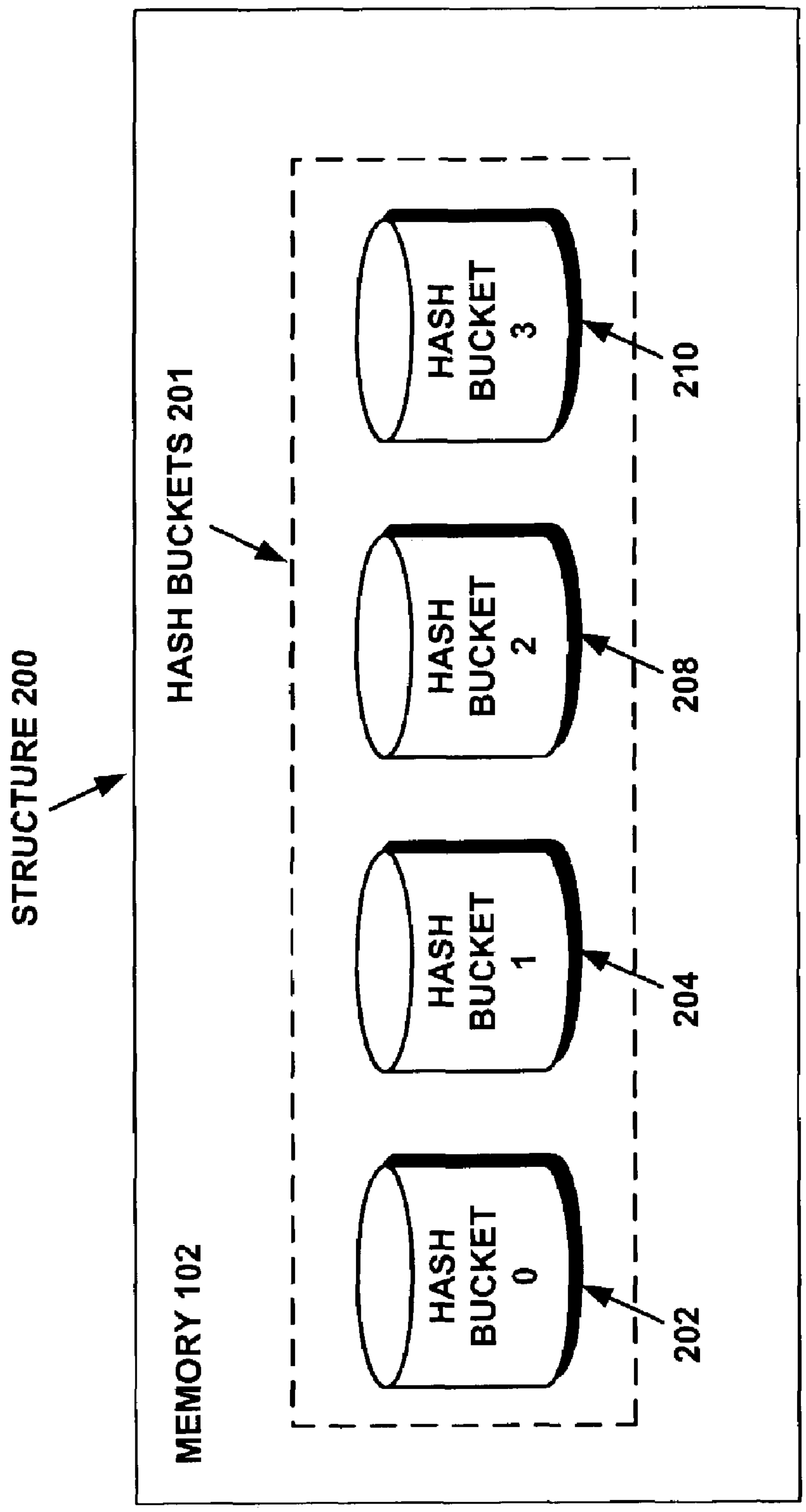
FIG. 2 is a diagram showing a structure used by the database management system of FIG. 1 for locating buffer pool pages in the buffer pool.

FIG. 2 shows a structure 200 used by the DBMS 100 of FIG. 1 for finding the buffer pool pages 106 in the buffer pool 107. Hashing is a methodology for finding pages in database 108 such as buffer pool pages 106 in the buffer pool 107. Each buffer pool 107 has a set of hash buckets 201 in the memory 102, such as hash bucket0 202, hash bucket1 204, hash bucket2 208, and hash bucket3 210. Each page descriptor 104 of buffer pool pages 106 of the database 108 may belong to only one of these hash buckets 201.

If the DBMS 100 were searching for a specific buffer pool page 106 (from the database 108), the DBMS 100 would check in the hash bucket 201 accorded to the corresponding page descriptor 104. The hash bucket 201 of page descriptor 104 is determined by computing a hashing function based on one or more attributes of the buffer pool page 106. If the entire hash bucket 201 is examined and the page descriptor 104 is not located, the buffer pool page 106 is determined as not in the buffer pool 107. Consequently, the DBMS 100 has located a free spot or region in the buffer pool 107 and can transfer a corresponding stored page 310 from disk of the database 108 into this free region of the buffer pool 107.

Transferring a stored page 310 from the disk of the database 108 into this free region provides the buffer pool page 106 with the contents of the stored page 310. For example, suppose the hashing algorithm is "page number % number of buckets", and the DBMS 100 is attempting to determine whether page2 is in the buffer pool 107 (the term % is a modulous symbol). Therefore, "2% 4=2", meaning that if page2 were in the buffer pool 107 it would be found in hash bucket2 208. Therefore, the DBMS 100 would look through the hash bucket 201 to locate page2 In this example, the DBMS 100 would notice that page2 is not in hash bucket2 208 (since it is EMPTY). The DBMS 100 would be forced to transfer the page2 from disk of the database 108 into a free region within the buffer pool 107.

FIG. 3 shows a structure 300 for fixing and unfixing buffer pool pages 106 of FIG. 1. Agent 111, particularly referenced as agents 302 and 304, are not allowed to return to the user 306, 308 with the buffer pool page 106 latched. For example, actions such as scanning a table contained in the database 108 having two hundred rows on the buffer pool page 106 will result in two hundred fix and unfix calls for each table page 310 in the table of the database 108. Note that the table is made up of multiple table pages 310, and each table page 310 contains rows (i.e. table data). The database table page 310 can only be fixed once it is in the buffer pool 107. Agents 302, 304 cannot directly access the table page 310 in the database 108, since the table page 310 must first be read into the buffer pool 107 first as buffer pool page 106. Thus it is the database table page 310 that is in the buffer pool 107.

This reading of the table page 310 into the buffer pool 107 can be an expensive operation, since fixing the page in the table, the fix, may force DBMS 100 to relocate the table page 310 in the buffer pool 107 through the hash lookup operation. The hash look up, described in FIG. 2, is a well known scheme in the art.

In these situations, the agent 302, 304 knows it will be processing the same database table page 310. Database table pages 310 are unique in the database 108. They are uniquely identified, for example, by objects such as table id, index id, tablespace ID, and page number. The agent 302, 304 may perform the following operations to a corresponding buffer pool page 106: fixing the buffer pool page 106, unlatching and latching the pinned buffer pool page 106, and unfixing the buffer pool page 106. Fixing the buffer pool page 106 refers to pinning and latching the buffer pool page 106. The buffer pool page 106 may be unlatched and latched as many times as necessary. Unfixing the buffer pool page 106 refers to unlatching and unpinning the buffer pool page 106.

When the buffer pool page 106 of the buffer pool 107 is latched and unlatched using the buffer pool resizer 101, the cost of having to relocate the corresponding database page 310 is reduced. This cost reduction occurs because the buffer pool page 106 is pinned in the buffer pool 107; the actions of pinning and latching the buffer pool page 106 are separated.

Figure 4:
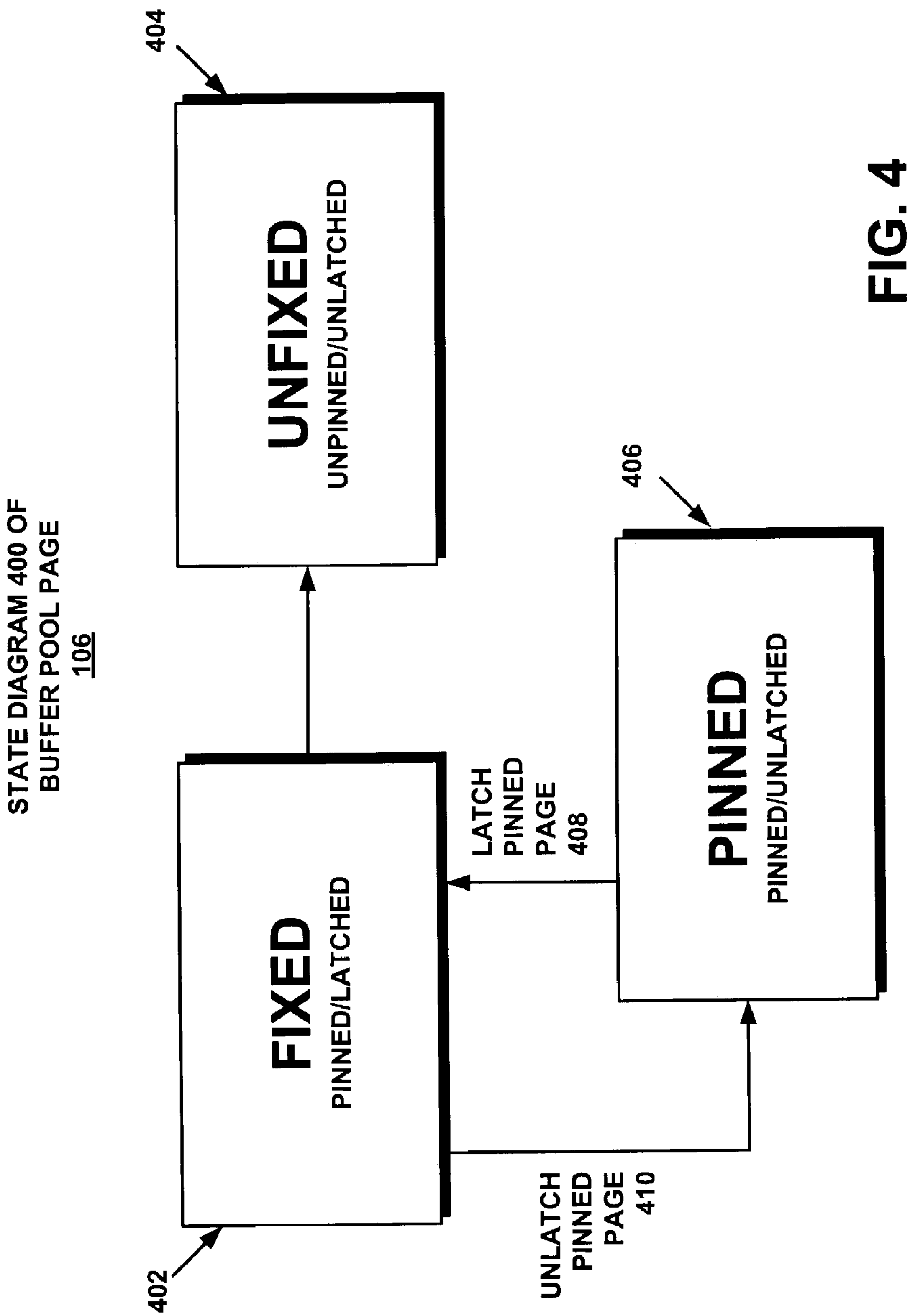
FIG. 4 is a diagram illustrating a state diagram of a buffer pool page in the buffer pool of the database management system of FIG. 1.

FIG. 4 shows a state diagram 400 of the buffer pool page 106 in the buffer pool 107. The requirement that the pinned buffer pool page 106 remains pinned in the same spot in the buffer pool 107 is removed; i.e., the pinned buffer pool page 106 can be relocated within the buffer pool 107. As long as the pinned buffer pool page 106 is guaranteed to exist somewhere within the buffer pool 107, the user 306, 308 of this pinned buffer pool page 106 does not have to depend on the pinned buffer pool page 106 being located at a specific region within the buffer pool 107.

This dynamic pinning procedure leads to several issues for consideration. One issue is determining how the pinned buffer pool page 106 is moved during a decrease in the size of the buffer pool 107. Another issue is determining how all new users 306, 308 of the pinned buffer pool page 106 are ensured of finding the pinned buffer pool page 106 in the new location or region of the buffer pool 107. For example, a free region (i.e. free page) is found in the buffer pool 107 allowing movement of the buffer pool page 106, wherein the free region is not in the area of the buffer pool 107 being decreased. When the buffer pool 107 is being reduced in size, the buffer pool resizer 101 decides which part of the buffer pool 107 will be freed.

Consequently, the buffer pool resizer 101 has knowledge regarding which part of the buffer pool 107 needs to be emptied of buffer pool pages 106 so that it can be freed. The buffer pool resizer 101 thus knows what other part of the buffer pool 107 is not going to be freed in the context of the current decrease operation. The buffer pool resizer 101 can intelligently find a free region in the area of the buffer pool 107 which is not to be freed for the pinned buffer pool page 106 which is currently in the area of the buffer pool 107 which is to be freed. Yet another issue involves determining how the current "pinners" of the pinned buffer pool page 106 are handled. Pinners are agent 111 that have pinned the buffer pool page 106.

As illustrated in FIG. 4, the agent 111 using a specific buffer pool page 106 in the buffer pool 107 is in one of 3 states. The agent 111 that has pinned the buffer pool page 106 would be in pinned 406, the pinned state. Another issue involves determining when the buffer pool resizer 101 may free memory 102 of the buffer pool 107 that the pinned buffer pool page 106 occupies.

Referring to FIG. 4, fixed 402 indicates that the buffer pool page 106 has been placed in a fixed state. The buffer pool page 106 is fixed when the agent 111 wishes to use the buffer pool page 106. To put the buffer pool page 106 in the fixed state, the agent 111 first pins the buffer pool page 106 in a region of the buffer pool 107. Typically, this is accomplished by incrementing a fixCount (not shown) in the page descriptor 104. The fixCount>0 indicates to any other agent 111 (potentially one that is looking for a victim page in which to read another page), that the buffer pool page 106 in question is currently in use and cannot be evicted from the buffer pool 107.

The agent 111 then latches the buffer pool page 106 by a latch operation 408. This latch operation is exclusively (X) if the agent 111 is updating the buffer pool page 106, or shared (S) if the agent 111 is just reading the buffer pool page 106. Latching is the method for controlling concurrency on the buffer pool page 106 across multiple agent 111 that have all pinned the same buffer pool page 106. The buffer pool page 106 is considered FIXED when it has been pinned and latched. The buffer pool page 106 is in one of three states; unfixed 404, fixed 402, or pinned 406. The state unfixed 404 can be considered the initial state of the buffer pool page 106 in the buffer pool 107; i.e., no agent 11 has pinned or latched the buffer pool page 106.

The state unfixed 404 indicates the buffer pool page 106 has been placed in the unfixed state; the buffer pool page 106 is unlatched and unpinned.

The state pinned 406 indicates that the buffer pool page 106 has been placed in the pinned state. The pinned buffer pool page 106 goes to the fixed buffer pool page 106 when the buffer pool page 106 is latched by the latch operation 408; the FIXED buffer pool page 106 is both pinned and latched. The buffer pool page 106 can thus be FIXED (i.e. pinned and latched), UNFIXED (neither pinned nor latched), or PINNED only (not latched), representing the three states. Further, the buffer pool page 106 cannot be latched without being pinned first. Therefore, once pinned, the buffer pool page 106 can alternate between the states fixed 402 and pinned 406 by the operation latch pinned page 408 and unlatch pinned page 410 respectively. Operations latch pinned page 408 and unlatch pinned page 410 could be performed by a latching module (not shown) of the DBMS 100.

Once all the buffer pool pages 106 have been relocated as desired, the buffer pool resizer 101 (FIG. 1) is the specific agent 111 that has been asked to resize the buffer pool 107. Similar to the manner in which agent 111 act on behalf of users 306, 308 to retrieve information, the agent 111 resizing the buffer pool 107 is acting on behalf of the user 306, 308 who asked to alter the size of the buffer pool 107. In the DBMS 100, there can be many agent 111 (processes or threads) acting on behalf of users 306, 308 at any given time. Some agent 111 may be retrieving information, some may be updating information, another may be resizing the buffer pool 107, another may be backing up the database 108, etc.

Figure 5A:
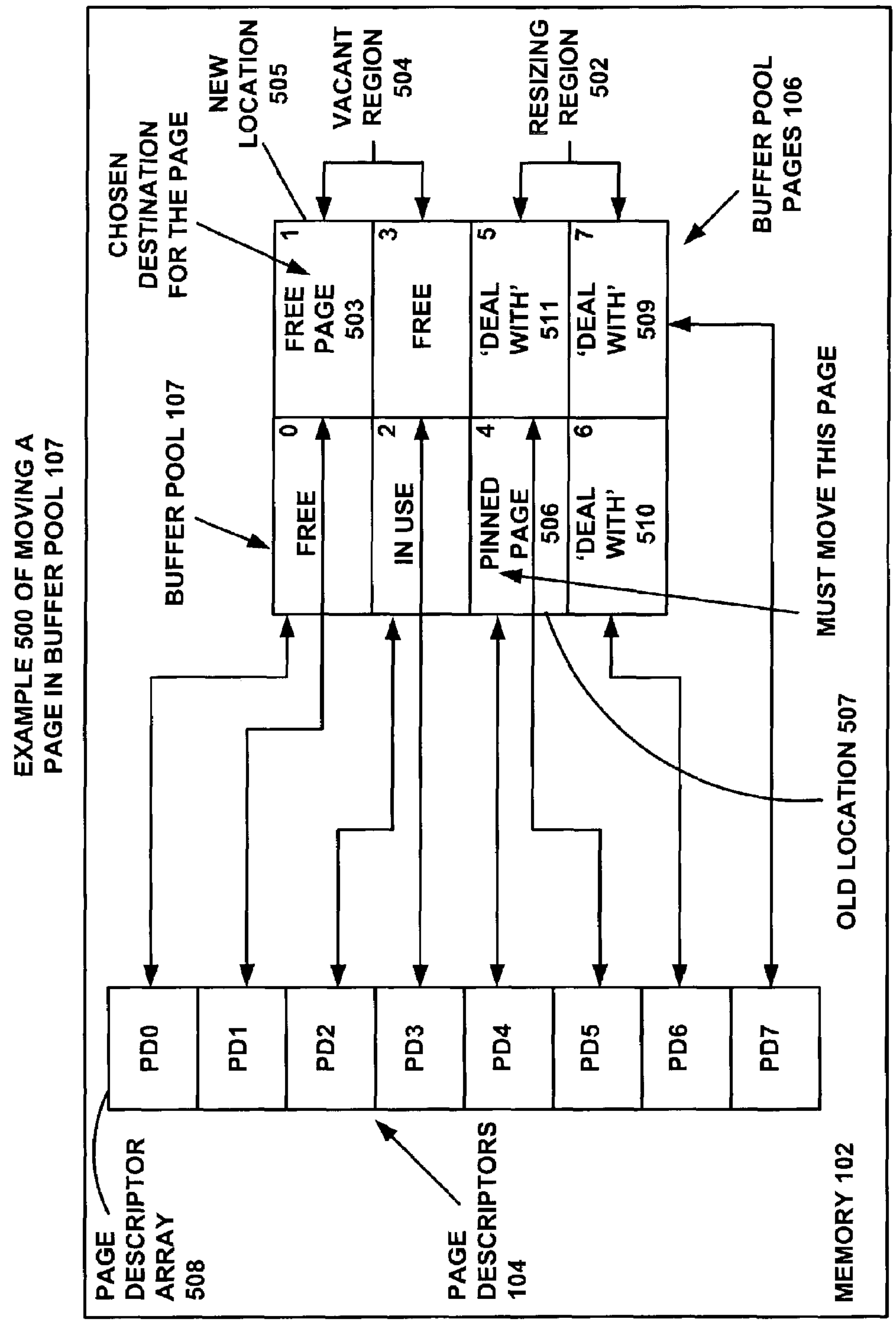
FIG. 5A is a diagram illustrating an example of moving a buffer pool page during an operation for resizing the buffer pool of the database management system of FIG. 1.

FIG. 5A is a diagram illustrating the example 500 of determining how the pinned buffer pool page 106 is moved during a decrease in the size of the buffer pool 107. The buffer pool resizer 101 of FIG. 1 first encounters the pinned buffer pool page 106, pinned page 506. The buffer pool resizer 101 must first locate a vacant region 504 in the buffer pool 107 into which the buffer pool resizer 101 may move the buffer pool page 106. This vacant region 504 is not within a resizing region 502 that is scheduled for resizing. Once the new vacant region 504 for the buffer pool page 106 is found in the buffer pool 107, the buffer pool page 106 is copied into its new location 505, free page 503. To prevent new agent 111 from finding the buffer pool page 106 at the previous location, pinned page 502, the page descriptor 104 of the previous buffer pool page 106 is removed from the hash bucket 201. The hash bucket 201 corresponds to the buffer pool page 106 and the new page descriptor 104 of buffer pool page 106 replaces the previous page descriptor 104 in the hash bucket 201. For example, referring to FIG. 5A, pinned page 502 is moved within the buffer pool 107 to a new location, free page 503. The pinned page 502 has a corresponding page descriptor PD4 at within the page descriptor array 508.

The buffer pool resizer 101 notes that free page 503 is a good spot in the buffer pool 107 for relocating the pinned page 506. Once moved, the pinned page 506 is now in free page 503 in the buffer pool 107 and has a new page descriptor PD1 in the page descriptor array 508, as well as a new buffer page designation P1. Since this is the new descriptor PD1 of page P1, it should properly describe the page P1. Therefore, the page information is copied from the page descriptor PD4 in the page descriptor array 508, to the page descriptor PD1 in the page descriptor array 508 (i.e. the new page descriptor 104). Accordingly, the old page P4 contents have been relocated in the vacant region 504 as new page P1, with a corresponding change in the page descriptor array 508 (i.e. the descriptor contents of the old descriptor PD4 have been copied to the new descriptor PD1).

The new agent 111 requesting the previous buffer pool page 106 at the previous location, pinned page 506, will be unable to find that buffer pool page 106. Buffer pool resizer 101 has removed the old page descriptor PD4 from the respective hash bucket 201 (see FIG. 2) and replaced the old page descriptor PD4 with the new page descriptor PD1. Instead, the new agent 111 searches the hash bucket 201 and finds the relocated buffer pool page 106 at the new spot, free page 503, within the buffer pool 107, as the new descriptor PD1 is found in the hash bucket 201 previously containing the old descriptor PD4.

The agent 111 next determines how the current "pinners" of the pinned buffer pool page 106 are handled. As for current systems, those buffer pool pages 106 placed in the pinned state hold a key to find their buffer pool page 106 within the buffer pool 107.

The buffer pool page 106 preferably does not hold the key. The agent 111 that pinned the buffer pool page 106 holds the key. "The "pinner" is the agent 111 that pinned the buffer pool page 106 and is now trying to relocate it so that it can reestablish access (latching) to the buffer pool page 106. The pinner uses the "key" to find the pinned buffer pool page 106. Typically, the agent 111 would perform the entire hash lookup operation to find the buffer pool page 106. However, because this is the pinned buffer pool page 106, the pinner (i.e. agent 111 that pinned the buffer pool page 106) has the "key" to directly find the buffer pool page 106. As explained below this "key" can be implemented as a pointer to the page descriptor 104 of the array 508. This key enables the pinners to quickly locate their buffer pool page 106 without searching the hash buckets 201 to find the page descriptor 104.

In one embodiment, this key is a pointer to the page descriptor 104 corresponding to the buffer pool page 106 in the buffer pool 107. Since the buffer pool page 106 must be latched before the buffer pool page 106 can be read or updated, this opportunity is used to determine whether the buffer pool page 106 has moved, allowing the agent 111 to find the buffer pool page 106 at the new location 505. The buffer pool page 106 is found at the new location 505 by examining the key (that is, the pointer). If the pointer is NULL (the default value), the buffer pool page 106 has not been moved. If the buffer pool page 106 has moved, the pointer is a valid value other than the default value and represents the location of the buffer pool page descriptor 104 at the new location 505 of the buffer pool page 106.

The agent 111 can then latch the new buffer pool page 106 and use the latched new buffer pool page 106 as the agent 111 wishes. If the buffer pool page 106 has not been moved the agent 111 will simply latch the buffer pool page 106 as desired. This key could also be an index into the array 508 of the new location 505 of pinned buffer pool pages 106. In this case, the buffer pool resizer 101 would update the location of the moved buffer pool page 106. Therefore when the pinner wishes to latch the buffer pool page 106 for use, the buffer pool page 106 can still be found using the same key.

The agent 302 (see FIG. 3) is considered a pinner if the agent 302 unlatches the buffer pool page 106 after it has fixed the buffer pool page 106. This is the method by which the agent 111 moves from the FIXED state to the PINNED state (FIG. 4).

After the buffer pool resizer 101 has moved the pinned buffer pool page 106 into its new location 505 outside of the buffer pool resizing region 502, the present system may now determine when the buffer pool resizer 101 may free memory 102 of the buffer pool 107 that the pinned buffer pool page 106 occupies. The buffer pool resizer 101 is the agent 111 that is resizing the buffer pool 107. The buffer pool resizer 101 must wait until all the current pinners of the buffer pool page 106 (that is, agent 111 wishing to pin the buffer pool page 106) have been informed of the new location 505 of the buffer pool page 106. The buffer pool resizer 101 will be put to sleep and will be woken up by the very last pinner of the buffer pool page 106.

The agent 111 that has/have fixed the buffer pool page 106 and then unlatched the buffer pool page 106 are the pinners of the buffer pool page 106. There may be more than one pinner pinning the same buffer pool page 106. The other agent 111 is the buffer pool resizer 101 that resizes the buffer pool 107. Once the buffer pool page 106 has been moved into the new location 505, only then will the old location 507 in the buffer pool 107 be placed or otherwise marked in a 'dealt with' state. The 'dealt with' state indicates that a location has been marked for resizing.

Alternatively, the buffer pool resizer 101 does not have to wait on each pinned buffer pool page 106. The buffer pool resizer 101 would still move the buffer pool page 106 to the new location 505, but the buffer pool resizer 101 would not wait until all the pinners of the buffer pool page 106 have been informed. Instead, the buffer pool resizer 101 can move on to the next buffer pool page 106. Once the buffer pool resizer 101 reaches the last buffer pool page 106 in the buffer pool resizing region 502, the buffer pool resizer 101 would be put to sleep. A global counter (not shown) can be used to indicate the number of pinned buffer pool pages 106 the buffer pool resizer 101 encountered. Each time the last pinner of the pinned buffer pool page 106 has been informed of the new location 505, the counter is decremented and the old location 507 of the pinned buffer pool page 106 is marked as "dealt with".

Continued operation now comprises two options: option A and option B. Option A comprises the pinner that eventually decrements the global counter to 0. When the global counter reaches 0, the pinner wakes up the buffer pool resizer 101. The pinner then informs the buffer pool resizer 101 that it is safe to free all the buffer pool pages 106 and memory 102 of page descriptors 104.

Option B comprises allowing the last pinner of the last pinned buffer pool page 106 to free the buffer pool page 106 and memory 102 of page descriptor 104. This allows the buffer pool resizer 101 to complete its operation when it reaches the last buffer pool page 106 in the resizing region 502 (without waiting to free the memory 102 is the last pinner of the last pinned buffer pool page 106).

Another possibility frees the page descriptors 104 and buffer pool pages 106 separately. Using this approach, once the buffer pool resizer 101 has 'dealt with' all the buffer pool pages 106 in the resize area 502 and moved all pinned buffer pool pages 106 into the new area 500, the memory 102 of buffer pool page 106 may be freed right away. As in option B above, the very last pinner in the resize area 502 will free the memory 102 of page descriptor 104. It is safe to free the memory 102 of buffer pool page 106 before all the pinners are completed, because the pinners' key 506 has been updated. If the pinners attempt to use the buffer pool page 106 at the old location 502, the pinners will find the buffer pool page 106 at the new location 505. This assumes that the key is stored in the page descriptor 104 rather than the buffer pool page 106.

FIG. 5A shows an example of moving the buffer pool page pinned page 506 during an operation for resizing buffer pool 107 of FIG. 1 from eight to four buffer pool pages 106. The present system is resizing the buffer pool 107 by 4 pages. Consequently, the buffer pool resizer 101 would start at the end of the buffer pool 107 and examine four spots: spot 509, 510, 510 and the spot containing pinned page 506.

During this examination, the present system ensures that no agent 111 are using the buffer pool pages 106 in these spots. If the buffer pool resizer 101 finds one of these buffer pool pages 106 is pinned the buffer pool resizer 101 must move this pinned page such as pinned page 506 from the resizing region 502 prior to resizing. Most pinned buffer pool pages 106 remain pinned for an extremely long time. In the case of FIG. 5A, the buffer pool resizer 101 notices that the buffer pool page 506 is pinned, therefore the buffer pool resizer 101 finds the vacant region 504 at free page 503 in the buffer pool 107. The buffer pool resizer then moves the pinned page 506 to free page 503, which is then renamed P1. Further, the key and page descriptor PD4 are reset to point to PD1. The buffer pool resizer 101 could have a determinator module (not shown) for determining the location and extent of the vacant region 504, and/or the suitability of the location and extent of the resizing region 502.

Figure 5B:
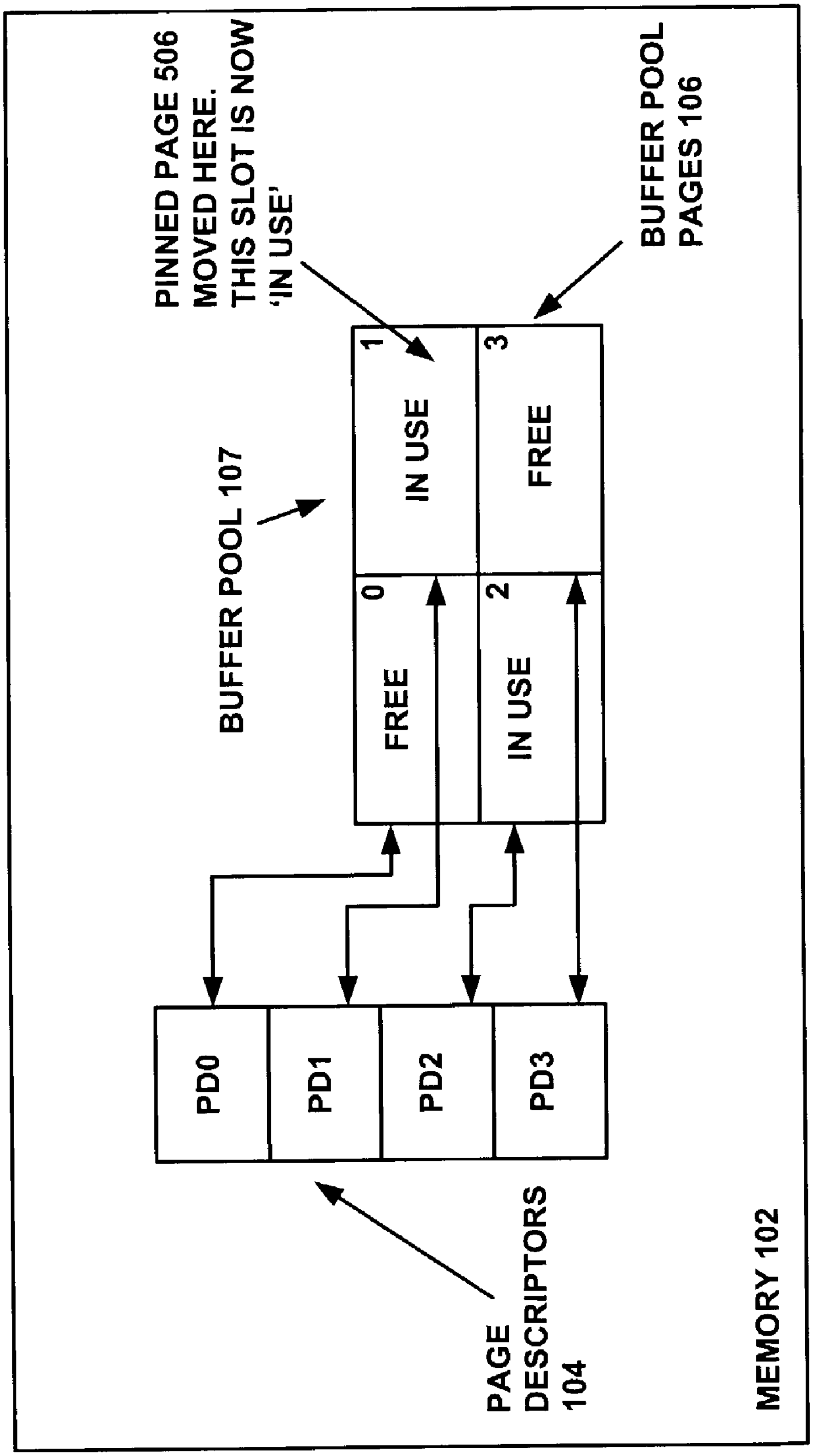
FIG. 5B is a process flow chart illustrating the method of the example of FIG. 5A after the buffer pool page of the database management system of FIG. 1 has been moved.

FIG. 5B shows the buffer pool 107 of FIG. 5A after resizing. The buffer pool 107 is now resized to 4 buffer pool pages 106. The resizing region 502 in the buffer pool 107 and corresponding page descriptors 504 are no longer associated with the resized buffer pool 107 because this memory 102 has now been freed.

FIGS. 6A, 6B, 6C, 6D, and 6E illustrate the method S600 operation of the buffer pool resizer 101 of FIG. 1 for resizing the buffer pool 107 when processing the query 110 "Alter buffer pool X size Y".

Operation S601 starts the buffer pool resizer 101. Operation S602 determines whether buffer pool 107 will be decreased in size. If the buffer pool 107 will not be decreased in size, control is transferred to operation S603. If the buffer pool 107 will be decreased in size, control is transferred to operation S604.

Operation S603 increases the size of buffer pool 107. Operation S604 determines whether there are any more buffer pool pages 106 to be freed from the resizing area 502. If there are no more buffer pool pages 106 to be freed, control is transferred to operation S605. If there are more buffer pool pages 106 to be freed, control is transferred to operation S606. Operation S605 frees buffer pool pages 106 and memory 102 of page descriptor 104. Operation S624 stops operation of the buffer pool resizer 101 of FIG. 1 after operation S603 is executed or operation S605 is executed.

Operation S606 determines whether there are buffer pool pages 106 of the buffer pool 107 that are unfixed and unpinned. If the buffer pool page 106 of the buffer pool 107 is unfixed and unpinned, control is transferred to operation S609. If the buffer pool page 106 of the buffer pool 107 is not unfixed and unpinned, control is transferred to operation S607.

Operation S607 determines whether the buffer pool page 106 is fixed. If the buffer pool page 106 is fixed, control is transferred to operation S613. If the buffer pool page 106 is not fixed, control is transferred to operation S608. Operation S608 determines whether the buffer pool page 106 is pinned. If the buffer pool page 106 is pinned, control is transferred to operation S616. If the buffer pool page 106 is not pinned, control is transferred to operation S604 (in which case another buffer pool page 106 may be freed).

Figure 6A:
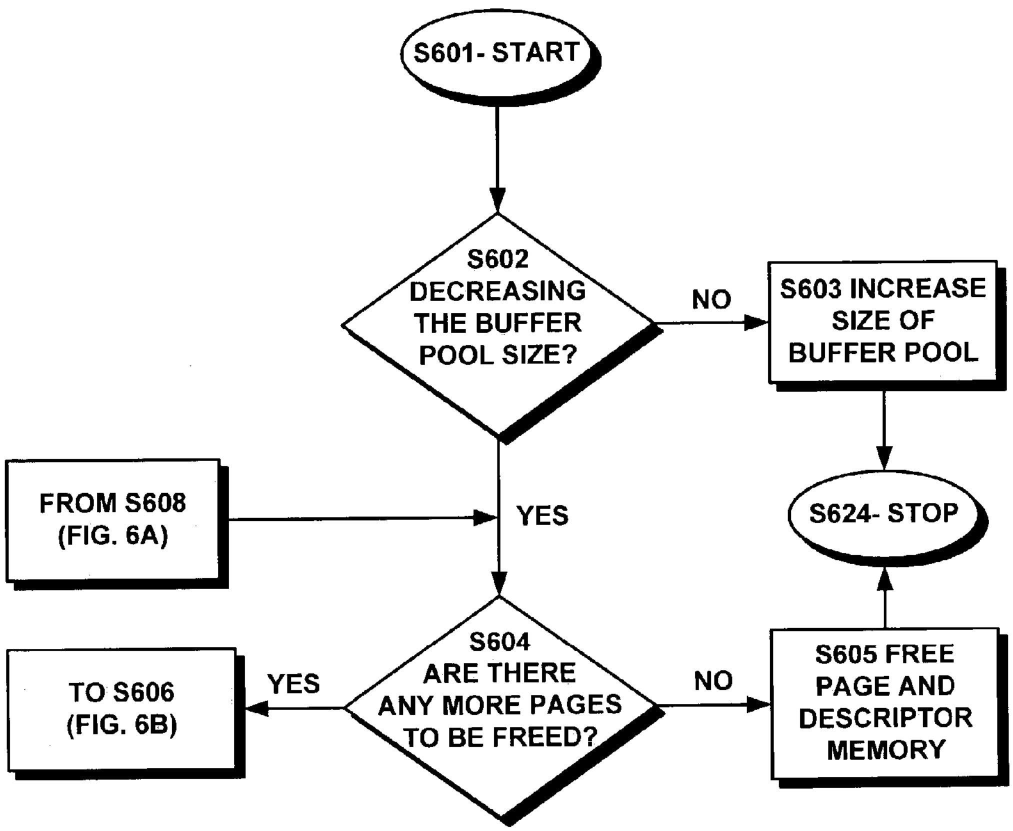
FIG. 6 (FIGS. 6A, 6B, 6C, 6D, and 6E) is a process flow chart illustrating a method of operation of a buffer pool resizing module for resizing the buffer pool of the database management system of FIG. 1.
Figure 6B:
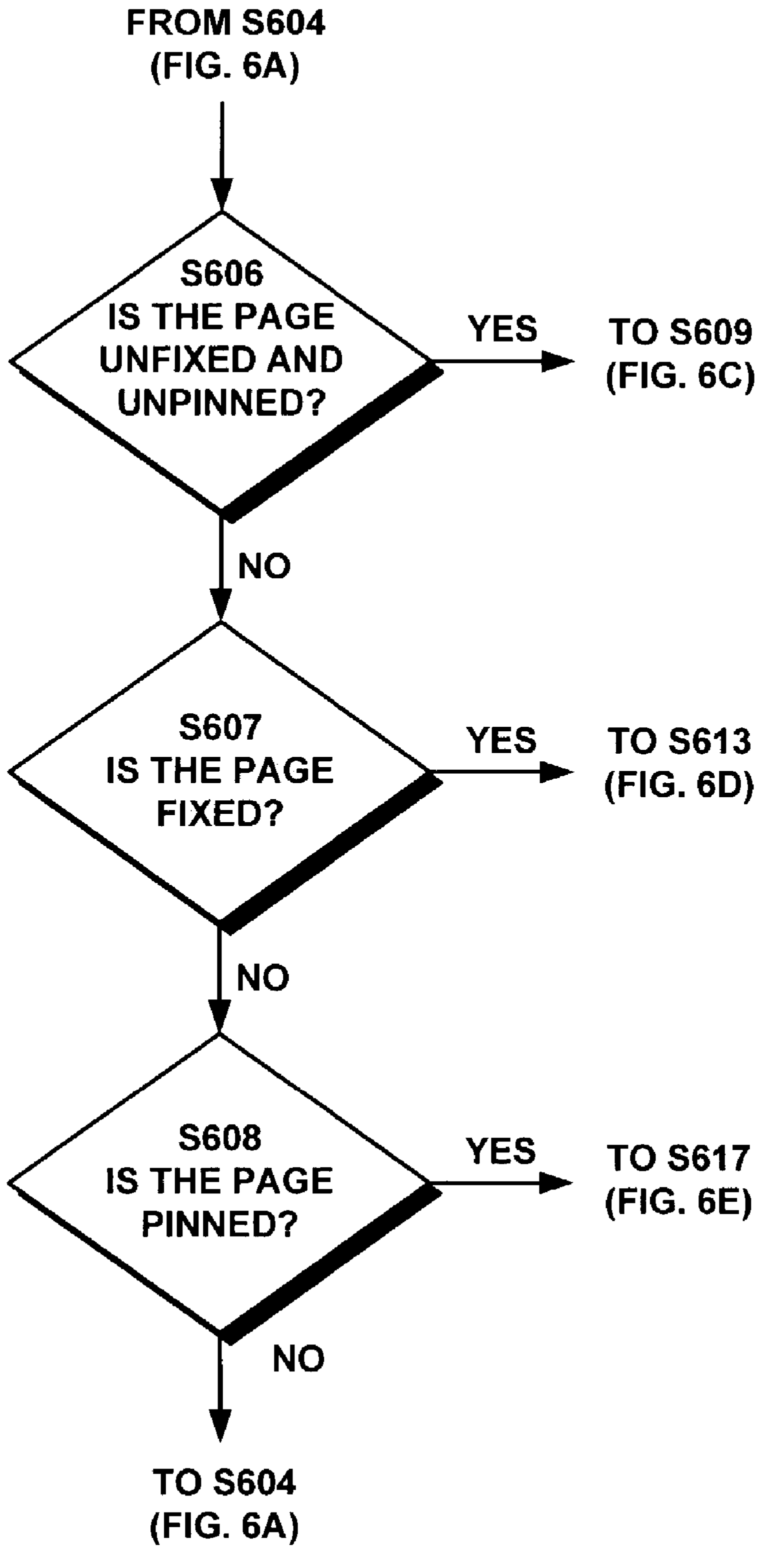
Figure 6C:
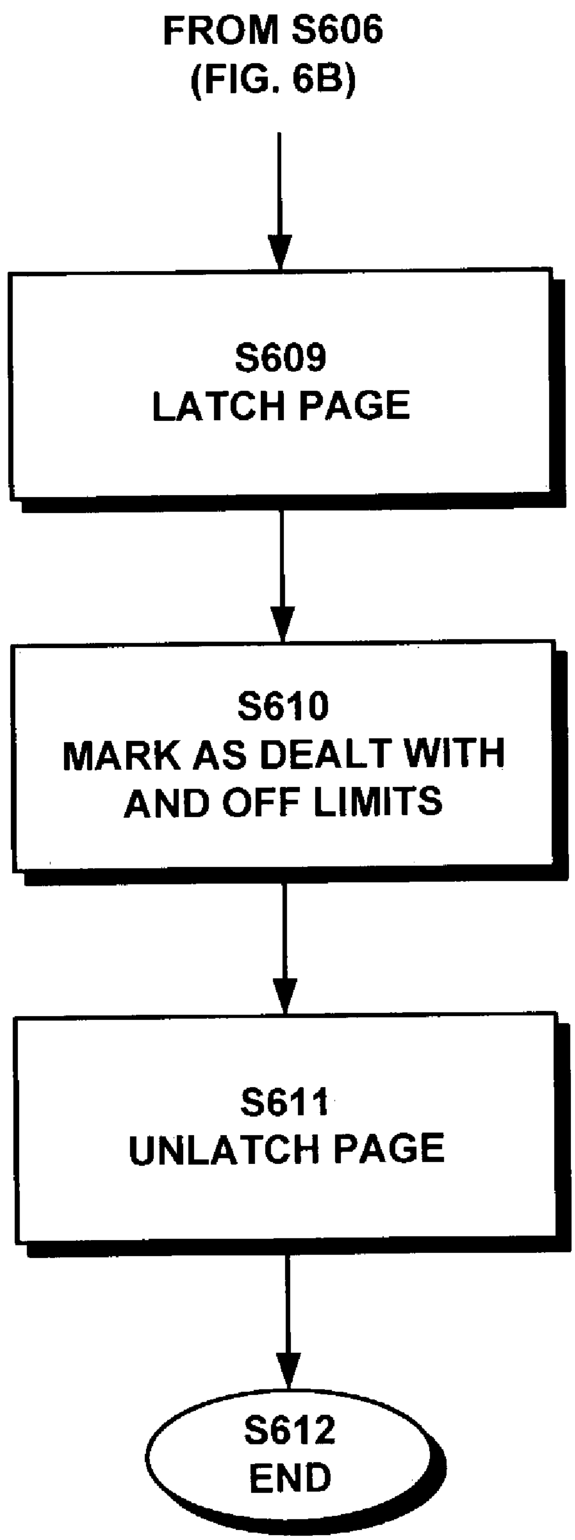

Referring to FIG. 6C, operation S609 latches the buffer pool page 106. Operation S610 marks the latched buffer pool page 106 as "dealt with" and "off limits" (i.e. marked as ready for resizing). Operation S611 includes unlatching the latched buffer pool page 106. The operation of buffer pool resizer 101 is then stopped at operation S612.

Figure 6D:
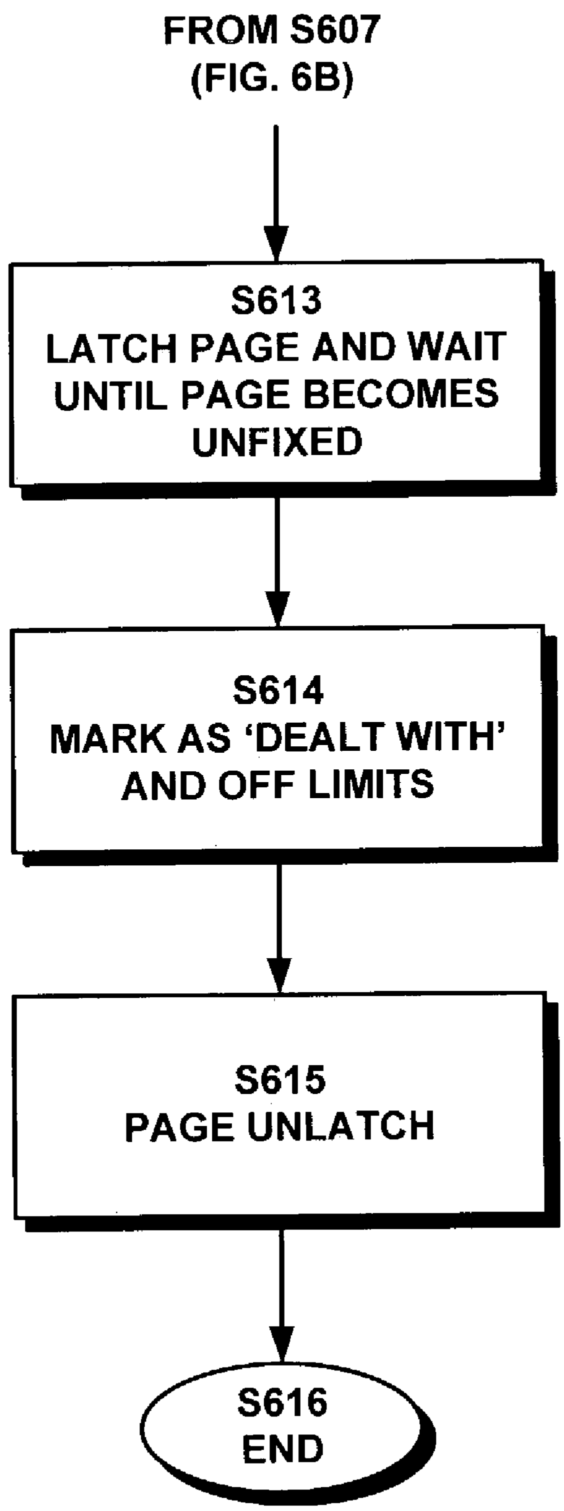

Referring to FIG. 6D, operation S613 latches the buffer pool page 106 and waits until the buffer pool page 106 becomes unfixed. Operation S614 marks the buffer pool page 106 as "dealt with" and "off limits". "Off limits" means that no agent 111 should be using the buffer pool page 106 found at this spot in the buffer pool 107, as the buffer pool page 106 is now ready to be relocated to the new location 505. Operation S615 unlatches the buffer pool page 106. The operation of the buffer pool resizer 101 is then stopped at operation S616.

Figure 6E:
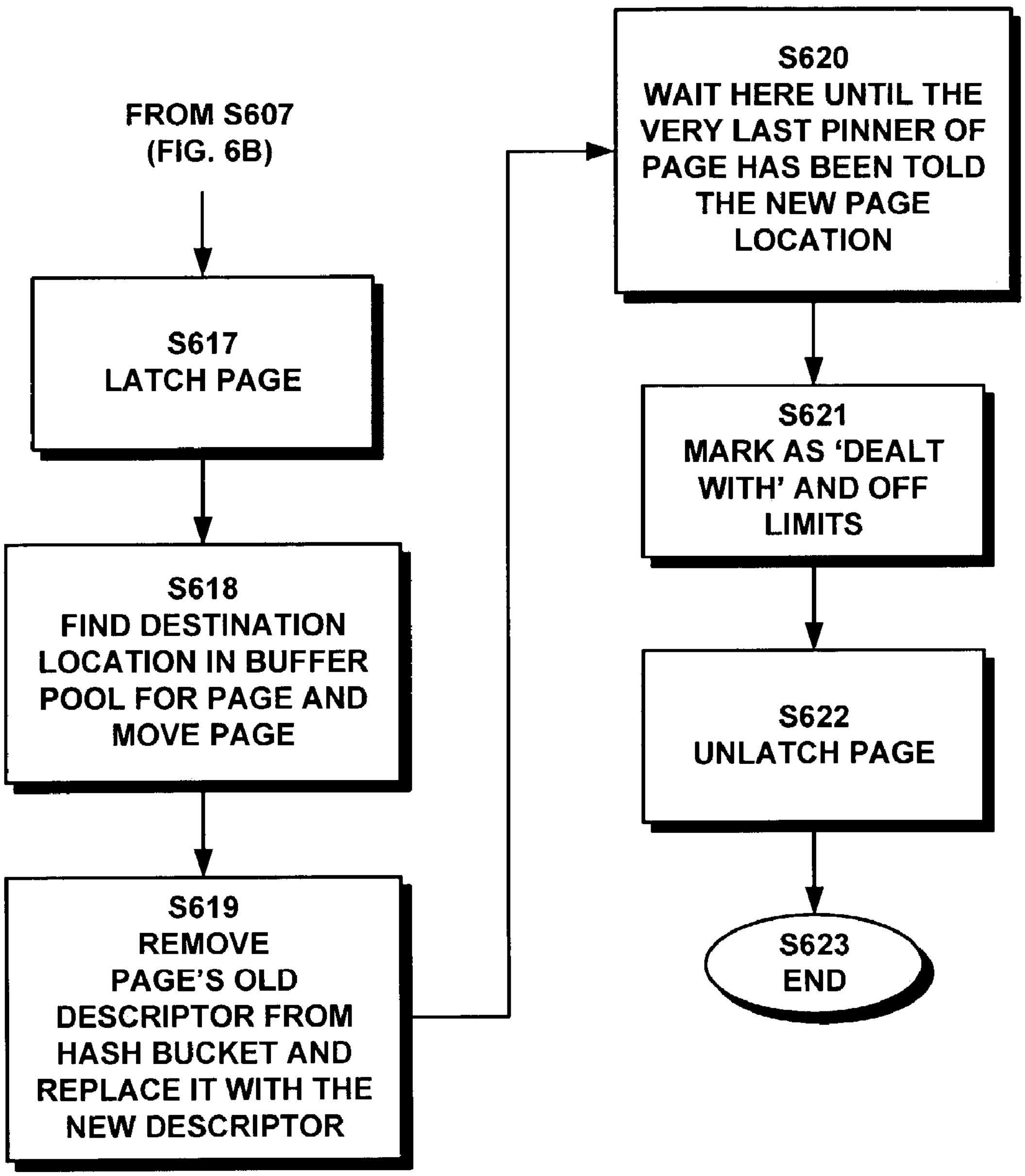

Referring to FIG. 6E, operation S617 latches the buffer pool page 106. Operation S618 finds the new location 505 in the buffer pool 107 that is the destination of the buffer pool page 106 and moves the buffer pool page 106. Operation S619 removes the old page descriptor 104 of the buffer pool page 106 from the hash bucket 201 and replaces it the old page descriptor 104 it with the new page descriptor 104 (i.e., replaces PD$ with PD1). Operation S620 waits until the very last pinner of the buffer pool page 106 has been told the new location 505. Operation S621 marks old location 507 of the moved buffer pool page 106 as 'dealt with' and "off limits" for subsequent resizing. Operation S622 unlatches the old location 502 of the buffer pool page 106. The operation of buffer pool resizer 101 is then stopped at operation S623.

Once all the buffer pool pages 106 and memory 102 of page descriptor 104 has been freed, the buffer pool 107 is considered resized successfully.

In an alternative embodiment, there is provided a computer program product having a computer-readable medium tangibly embodying computer executable instructions for directing a data processing system to implement any method or data processing system described below. The computer program product may be a floppy disk, hard disk or other medium for long term storage of the computer executable instructions.

In an alternative embodiment, there is provided an article having a computer-readable signal-bearing medium, and having means in the medium for directing a data processing system to implement any method to be described below. A supplier of the method may upload the article to a network (such as the Internet) and users may download the article via the network to their respective data processing systems.

Variations of some elements are possible to adapt the invention for specific conditions or functions. The concepts of the present invention can be further extended to a variety of other applications that are clearly within the scope of this invention. Having thus described the present invention with respect to embodiments as implemented, it will be apparent to those skilled in the art that many modifications and enhancements are possible to the present invention without departing from the scope and spirit of the present invention.

What is claimed is:

1. A method for directing a database management system to relocate buffer pages that are pinned in a buffer pool, the method comprising:

selecting one of the pinned buffer pages;

defining a page descriptor associated with the buffer page, and indicating a location of the selected buffer page in the buffer pool;

latching the selected pinned page in a resize region of the buffer pool, to cause the pinned page to become a fixed page;

determining a relocation region of the buffer pool for the fixed page;

copying a content of the fixed page to the relocation region; and changing the page descriptor to refer to the relocation region.

2. The method of claim 1, further comprising marking the resize region of the buffer pool for subsequent resizing, once the content of the fixed page has been copied to the relocation region.

3. The method of claim 2, further comprising unlatching the fixed page at the resize region.

4. The method of claim 3, wherein the relocation region does not reside in the resize region.

5. The method of claim 4, further comprising deleting the resize region from the buffer pool.

6. The method of claim 1, wherein latching the selected pinned page in the resize region is preceded by finding the selected page in the resize region of the buffer pool in a state selected from a group comprising: unfixed and unpinned pages, fixed pages, and pinned pages.

7. The method of claim 6, wherein finding the selected pinned page in the resize region of the buffer pool is followed by confirming that the selected page is pinned.

8. The method of claim 1, further comprising removing, from a hash bucket, the page descriptor that indicates the resize region, and replacing the page descriptor with a new page descriptor that is associated with the relocation region.

9. The method of claim 8, further comprising changing a key used by a current pinning agent of the selected buffer page, for enabling the selected page to be located by the agent.

10. The method of claim 9, further comprising selecting the key from the group comprising: an index of an array of buffer page locations in the buffer pool, and a pointer to the page descriptor corresponding to the selected page in the buffer pool; and using a value of the key as the pointer, and selecting the key from a group comprising: a default value indicating that the buffer page has not been relocated, and a valid value representing a new relocation region of the fixed page.

11. A computer program product having instruction codes embodied on a computer-readable medium, for directing a database management system to relocate buffer pages that are pinned in a buffer pool, the computer program product comprising:

a first set of instruction codes for selecting one of the pinned buffer pages;

a second set of instruction codes for defining a page descriptor associated with the buffer page, to indicate a location of the selected buffer page in the buffer pool;

a third set of instruction codes for latching the selected pinned page in a resize region of the buffer pool, to cause the pinned page to become a fixed page;

a fourth set of instruction codes for determining a relocation region of the buffer pool for the fixed page;

a fifth set of instruction codes for copying a content of the fixed page to the relocation region; and a sixth set of instruction codes for changing the page descriptor to refer to the relocation region.

12. The computer program product of claim 11, further comprising a seventh set of instruction codes for marking the resize region of the buffer pool for subsequent resizing, once the content of the fixed page has been copied to the relocation region.

13. The computer program product of claim 12, further comprising an eighth set of instruction codes for unlatching the fixed page at the resize region.

14. The computer program product of claim 13, wherein the relocation region does not reside in the resize region.

15. The computer program product of claim 14, further comprising a ninth set of instruction codes for deleting the resize region from the buffer pool.

16. The computer program product of claim 11, further comprising a tenth set of instruction codes for finding the selected page in the resize region of the buffer pool in a state selected from a group comprising: unfixed and unpinned pages, fixed pages, and pinned pages, prior to latching the selected pinned page in the resize region.

17. The computer program product of claim 16, further comprising an eleventh set of instruction codes for confirming that the selected page is pinned prior to the implementation of the tenth set of instruction codes, to find the selected pinned page in the resize region of the buffer pool.

18. The computer program product of claim 11, further comprising a twelfth set of instruction codes for removing, from a hash bucket, the page descriptor that indicates the resize region, and for replacing the page descriptor with a new page descriptor that is associated with the relocation region.

19. The computer program product of claim 18, further comprising a thirteenth set of instruction codes for changing a key used by a current pinning agent of the selected buffer page, to enable the selected page to be located by the agent.

20. The computer program product of claim 19, further comprising a fourteenth set of instruction codes for selecting the key from the group comprising: an index of an array of buffer page locations in the buffer pool, and a pointer to the page descriptor corresponding to the selected page in the buffer pool; and wherein the fourteenth set of instruction codes uses a value of the key used as the pointer, and selects the key from a group comprising: a default value indicating that the buffer page has not been relocated, and a valid value representing a new relocation region of the fixed page.

21. A system for directing a database management system to relocate buffer pages that are pinned in a buffer pool, the system comprising:

means for selecting one of the pinned buffer pages;

means for defining a page descriptor associated with the buffer page, to indicate a location of the selected buffer page in the buffer pool;

means for latching the selected pinned page in a resize region of the buffer pool, to cause the pinned page to become a fixed page;

means for determining a relocation region of the buffer pool for the fixed page;

means for copying a content of the fixed page to the relocation region; and means for changing the page descriptor to indicate the relocation region.

22. The system of claim 21, further comprising means for marking the resize region of the buffer pool for subsequent resizing, once the content of the fixed page has been copied to the relocation region.

23. The system of claim 22, further comprising means for unlatching the fixed page at the resize region.

24. The system of claim 23, wherein the relocation region does not reside in the resize region.

25. The system of claim 24, further comprising means for deleting the resize region from the buffer pool.

26. The system of claim 21, further comprising means for finding the selected page in the resize region of the buffer pool in a state selected from a group comprising: unfixed and unpinned pages, fixed pages, and pinned pages, prior to latching the selected pinned page in the resize region.

27. The system of claim 26 further comprising means for confirming that the selected page is pinned prior to the implementation of the means for finding the selected page in the resize region of the buffer pool, to find the selected pinned page in the resize region of the buffer pool.

28. The system of claim 21, further comprising means for removing, from a hash bucket, the page descriptor that indicates the resize region, aid for replacing the page descriptor with a new page descriptor that is associated with the relocation region.

29. The system of claim 28, further comprising means for changing a key used by a current pinning agent of the selected buffer page, to enable the selected page to be located by the agent.

30. The system of claim 29, further comprising means for selecting the key from the group comprising: an index of an array of buffer page locations in the buffer pool, and a pointer to the page descriptor corresponding to the selected page in the buffer pool; and wherein the means for selecting the key uses a value of the key used as the pointer, and selects the key from a group comprising: a default value indicating that t he buffer page has not been relocated, and a valid value representing a new relocation region of the fixed page.

* * * * *